United States Patent
Boitei (10) Patent No.: US 9,921,766 B2
(45) Date of Patent: *Mar. 20, 2018

(54) METHODS AND SYSTEMS FOR MANAGING MEMORY OF A STORAGE DRIVE

(71) Applicant: Wipro Limited, Bangalore (IN)

(72) Inventor: Manasa Ranjan Boitei, Karnataka (IN)

(73) Assignee: WIPRO LIMITED, Bangalore (IN)

(*) Notice: Subject to any disclaimer, the term of this patent is extended or adjusted under 35 U.S.C. 154(b) by 50 days.

This patent is subject to a terminal disclaimer.

(21) Appl. No.: 14/886,733

(22) Filed: Oct. 19, 2015

(65) Prior Publication Data

US 2017/0052719 A1   Feb. 23, 2017

(30) Foreign Application Priority Data

Aug. 20, 2015  (IN) .......................... 4361/CHE/2015

(51) Int. Cl.
*G06F 12/00*    (2006.01)
*G06F 3/06*    (2006.01)
(Continued)

(52) U.S. Cl.
CPC ............ *G06F 3/0619* (2013.01); *G06F 3/065* (2013.01); *G06F 3/0655* (2013.01); *G06F 3/0688* (2013.01); *G06F 12/0246* (2013.01); *G06F 3/0629* (2013.01); *G06F 3/0643* (2013.01); *G06F 3/0683* (2013.01);
(Continued)

(58) Field of Classification Search
CPC ...... G06F 3/0619; G06F 3/065; G06F 3/0655; G06F 3/0688; G06F 3/0629; G06F 3/0643; G06F 3/0683; G06F 12/0246; G06F 12/0253; G06F 12/0646; G06F 12/0891; G06F 2212/7205; G06F 2212/7209

USPC ........ 711/103, 154, 156, 165; 707/752, 782, 707/802, 813, 818, 814, 820; 710/10, 34,
(Continued)

(56) References Cited

U.S. PATENT DOCUMENTS 9,524,236 B1 * 12/2016 Myung ............... G06F 12/0246
2010/0088482 A1    4/2010 Hinz
(Continued)

OTHER PUBLICATIONS

"Divide and conquer algorithms", Wikipedia, 7 pages (Sep. 2013).
(Continued)

*Primary Examiner* — Reba I Elmore
(74) *Attorney, Agent, or Firm* — Finnegan, Henderson, Farabow, Garrett & Dunner LLP (57) ABSTRACT

Methods and corresponding systems for managing memory of a storage drive are provided. The method includes determining a number of invalid pages in each memory block of a plurality of memory blocks in the storage drive. Thereafter, the method includes identifying a set of target memory blocks within the plurality of memory blocks. The set of target memory blocks is identified by determining a target memory block comprising the highest number of invalid pages amongst the plurality of memory blocks. The step of determining is iterated to determine further target memory blocks while the total number of valid pages in the set of target memory blocks is less than or equal to the total number of free pages in one of at least one free memory block and a garbage collection memory block in the storage drive. The method further includes recycling the set of target memory blocks.

20 Claims, 8 Drawing Sheets

(51) Int. Cl.
*G06F 12/02* (2006.01)
*G06F 12/06* (2006.01)
*G06F 12/0891* (2016.01)

(52) U.S. Cl.
CPC ...... *G06F 12/0253* (2013.01); *G06F 12/0646* (2013.01); *G06F 12/0891* (2013.01); *G06F 2212/1016* (2013.01); *G06F 2212/7205* (2013.01); *G06F 2212/7209* (2013.01); *G06F 2212/7211* (2013.01)

(58) Field of Classification Search
USPC ........ 710/40, 55, 56, 244, 310; 712/15, 225, 712/240
See application file for complete search history.

(56) References Cited

U.S. PATENT DOCUMENTS

2012/0096217 A1 4/2012 Son et al.
2012/0221784 A1 8/2012 Ban
2013/0339587 A1* 12/2013 Asnaashari ......... G06F 12/0246
 711/103
2014/0003142 A1 1/2014 Lee et al.

OTHER PUBLICATIONS

European Search Report from the European Patent Office for corresponding European Application No. 15 20 2600 dated Jun. 28, 2016.
Borja Peleato et al., "On the distribution of valid pp. with greedy garbage collection for NAND flash", 2012 IEEE Statistical Signal Processing Workshop (SSP).
Junghee Lee et al., "Preemptible I/O Scheduling of Garbage Collection for Solid State Drives", IEEE Transactions on Computer-Aided Design of Integrated Circuits and Systems ( vol. 32, Issue: 2, Feb. 2013 ).
Communication pursuant to Article 94(3) EPC from the European Patent Office relating to Application No. 15 202 600.1, dated Dec. 21, 2017 (5 pgs.).

* cited by examiner

METHODS AND SYSTEMS FOR MANAGING MEMORY OF A STORAGE DRIVE

PRIORITY CLAIM

This U.S. patent application claims priority under 35 U.S.C. § 119 to India Application No. 4361/CHE/2015, filed Aug. 20, 2015. The entire contents of the aforementioned application are incorporated herein by reference.

TECHNICAL FIELD

This disclosure relates generally to storage drives and more particularly to methods and systems for memory management in storage drives.

BACKGROUND

In Solid State Drives (SSDs), Garbage Collection (GC) is used for memory management by reclaiming memory that is no longer used. The memory so reclaimed returns to the free memory pool (pages) to be used for future write operations. Data is written in an SSD in terms of pages and erased in terms of memory blocks. Moreover, existing-data cannot be read and written back at the same place. Therefore, in order to claim a stale page in an SSD, the whole memory block that includes the stale page needs to be erased.

In conventional systems, a garbage collector component in the SSD selects that memory block for deletion which has the lowest number of valid pages. The garbage collector component then copies valid pages of this memory block to a free memory blocks and deletes that memory block. However, initiation of the garbage collection operation is performed only in response to a write operation on the SSD and when a controller in the SSD determines that only a threshold number of free memory blocks are left in the SSD. The threshold number may also be a single free memory block. As a result of this, writing operation on the SSD gets delayed and the user experience gets impacted. Moreover, frequent initiation of garbage collection operation overloads the system by consuming more CPU cycles. The reason being that for each garbage collection operation the main memory gets involved in the process of copying valid pages to a free memory block.

SUMMARY

In one embodiment, method of memory management in a storage drive is disclosed. The method includes determining number of invalid pages in each memory block of a plurality of memory blocks in the storage drive; identifying a set of target memory blocks within the plurality of memory blocks by: determining a target memory block comprising highest number of invalid pages amongst the plurality of memory blocks; and iterating the step of determining till total number of valid pages in the set of target memory blocks is less than equal to the total number of free pages in one of at least one free memory block and a Garbage Collection (GC) memory block in the storage drive; and recycling the set of target memory blocks.

In another embodiment, method of memory management in a storage drive is disclosed. The method includes determining number of invalid pages in each memory block of a plurality of memory blocks in the storage drive; identifying a set of memory blocks from the plurality of memory blocks through an iterative selection process, wherein the iterative selection process comprises selecting each memory block in the set of memory blocks comprising highest number of invalid pages amongst the plurality of memory blocks during an associated iteration, wherein each subsequent iteration in the iterative selection process for selecting a memory block excludes a memory block selected in a previous iteration, and wherein total number of valid pages in the set of memory blocks is less than equal to the total number of free pages in one of at least one free memory block and a GC memory block in the storage drive; and recycling the set of memory blocks.

In yet another embodiment, a storage drive is disclosed. The storage drive includes a drive controller comprising at least one processor; and a computer-readable medium storing instructions that, when executed by the at least one processor, cause the at least one processor to perform operations comprising: identifying a set of target memory blocks within the plurality of memory blocks by: determining a target memory block comprising highest number of invalid pages amongst the plurality of memory blocks; and iterating the step of determining while the total number of valid pages in the set of target memory blocks is less than or equal to the total number of free pages in one of at least one free memory block and a GC memory block in the storage drive; and recycling the set of target memory blocks.

In another embodiment, a non-transitory computer-readable storage device for memory management in a storage drive is disclosed. The non-transitory computer-readable storage device when executed by a computing device, cause the computing device to: determine number of invalid pages in each memory block of a plurality of memory blocks in the storage drive; identify a set of target memory blocks within the plurality of memory blocks by: determining a target memory block comprising highest number of invalid pages amongst the plurality of memory blocks; and iterating the step of determining while the total number of valid pages in the set of target memory blocks is less than or equal to the total number of free pages in one of at least one free memory block and a GC memory block in the storage drive; and recycle the set of target memory blocks.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
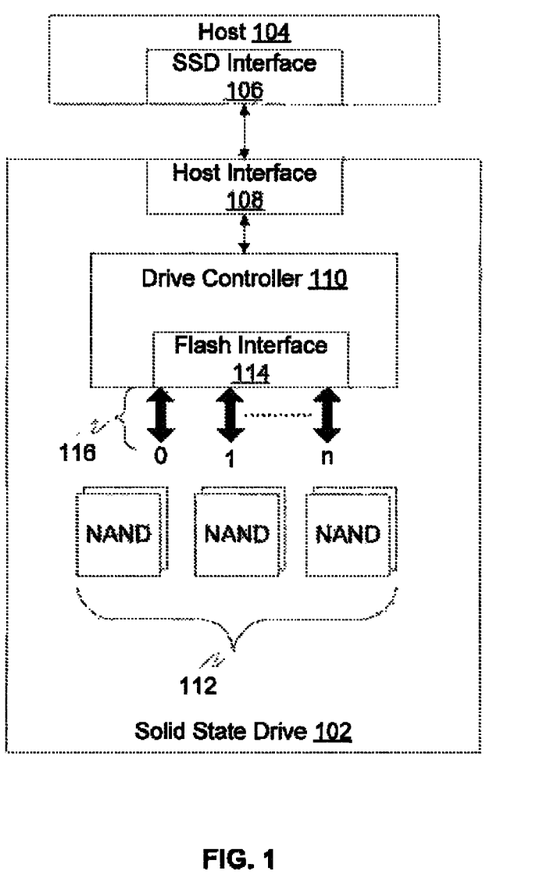
FIG. 1 illustrates a block diagram of an exemplary SSD for implementing various embodiments.

Additional illustrative embodiments are listed below. In one embodiment, a block diagram of a Solid State Drive (SSD) 102 (that is exemplary) for implementing various embodiments is illustrated in FIG. 1. A host 104 accesses SSD 102 to store and retrieve various types of data. Examples of host 104 may include, but are not limited to a laptop, a smart phone, a camera, a tablet, a computer, a smart television, a gaming device, a home theatre system, and a navigation device.

The communication between host 104 and SSD 102 is enabled through an SSD interface 106 in host 104 and a host interface 108 in SSD 102. Examples of these interfaces may include, but is not limited to Small Computer System Interface (SCSI), Fiber Channel, Peripheral Component Interconnect Express (PCIe), Serial Attached SCSI (SAS), Serial AT Attachment (SATA), Parallel AT Attachment (PATA), and Universal Serial Bus (USB). The communication may include commands for performing operations of data storing, data reading, and data erasing in SSD 102. A drive controller 110 in SSD 102 translates and executes these commands as read/write requests into a flash memory 112 through a flash interface 114 and flash channels 116. Flash memory 112 includes multiple NAND based flash memory chips and each such memory chip includes multiple memory blocks. Each memory block further includes multiple pages and each page is a unit of data read and write operation. A memory block, for example, may include 64 or 128 pages.

Figure 2:
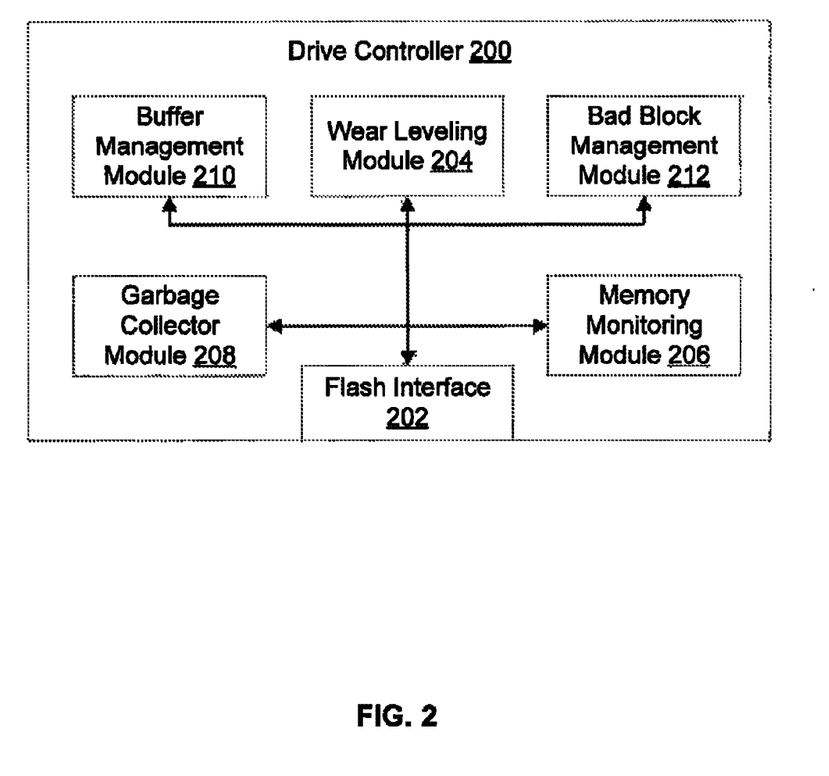
FIG. 2 is a block diagram illustrating a controller for memory management in a storage drive, in accordance with an embodiment.

Referring now to FIG. 2, a drive controller 200 for memory management in a storage drive is illustrated, in accordance with an embodiment. The storage drive is an SSD. Drive controller 200 receives commands from host 104 for performing operations of data storing, data reading, and data erasing in the SSD. Drive controller 200 then translates and executes these commands as read/write requests into a flash memory through a flash interface 202. To this end, drive controller 200 includes a wear levelling module 204, a memory monitoring module 206, a garbage collector module 208, a buffer management module 210, and a bad block management module 212.

Wear levelling module 204 maintains a page map table that includes number of invalid pages, number of valid pages, and number of free pages in each memory block in the SSD. Each time a data writing operation is performed, wear levelling module 204 updates the page map table. Memory monitoring module 206 communicates with wear levelling module 204 to determine the number of free memory blocks in the SSD based on data stored in the page map table. Whenever the number of free memory blocks in the SSD fall below a predefined threshold, for example three free memory blocks, memory monitoring module 206 communicates with garbage collector module 208 to initiate recycling of one or more memory blocks in the SSD.

Garbage collector module 208 determines number of invalid pages and valid pages in each memory block in the SSD using the page map table. An invalid page a unit of memory which stores corrupt or stale data, which either cannot be retrieved or is no longer of any use. Thereafter, garbage collector module 208 identifies a set of target memory blocks.

To this end, firstly, garbage collector module 208 determines a target memory block that includes the highest number of invalid pages in the SSD. Thereafter, garbage collector module 208 iterates the step of determining while the total number of valid pages in the set of target memory blocks is less than or equal to the total number of free pages in one or more free memory blocks or a GC memory block. In other words, after each iteration, garbage collector module 208 performs a check to see whether valid pages in the selected memory block can be accommodated within available free pages of the free memory block. Only when this condition is satisfied, garbage collector module 208 includes the selected memory block in the set of target memory blocks that are to be recycled.

Thereafter, garbage collector module 208 recycles the set of target memory blocks by copying the valid pages to the one or more free memory blocks and then converting each of the set of target memory blocks to a free memory block. Garbage collector module 208 then communicates with wear levelling module 204 to update the page map table so as to reflect the changes thus made. The method is explained in detail in conjunction with FIG. 3 and FIGS. 4A and 4B.

Further, buffer management module 210 reduces random writes to the SSD, thus increasing life span and performance of the SSD. Bad block management module 212 isolates bad memory blocks and adds these bad memory blocks into a bad block list. This enables bad block management module 212 to restraint drive controller 200 from writing data in these bad memory blocks.

Garbage collector module 208 selects a memory block to be recycled based on maximum invalid pages and minimum valid pages using the page map table. As a result, more invalid pages are freed and less valid pages are required to be copied to a free memory block. This improves the Input/Output performance of the SSD and frees up more space at a given time. Moreover, as more than one memory blocks are freed in a single garbage collection operation, system resource usage is optimized. Therefore, there is no delay in writing operation on the SSD and the user experience does not get impacted.

Figure 3:
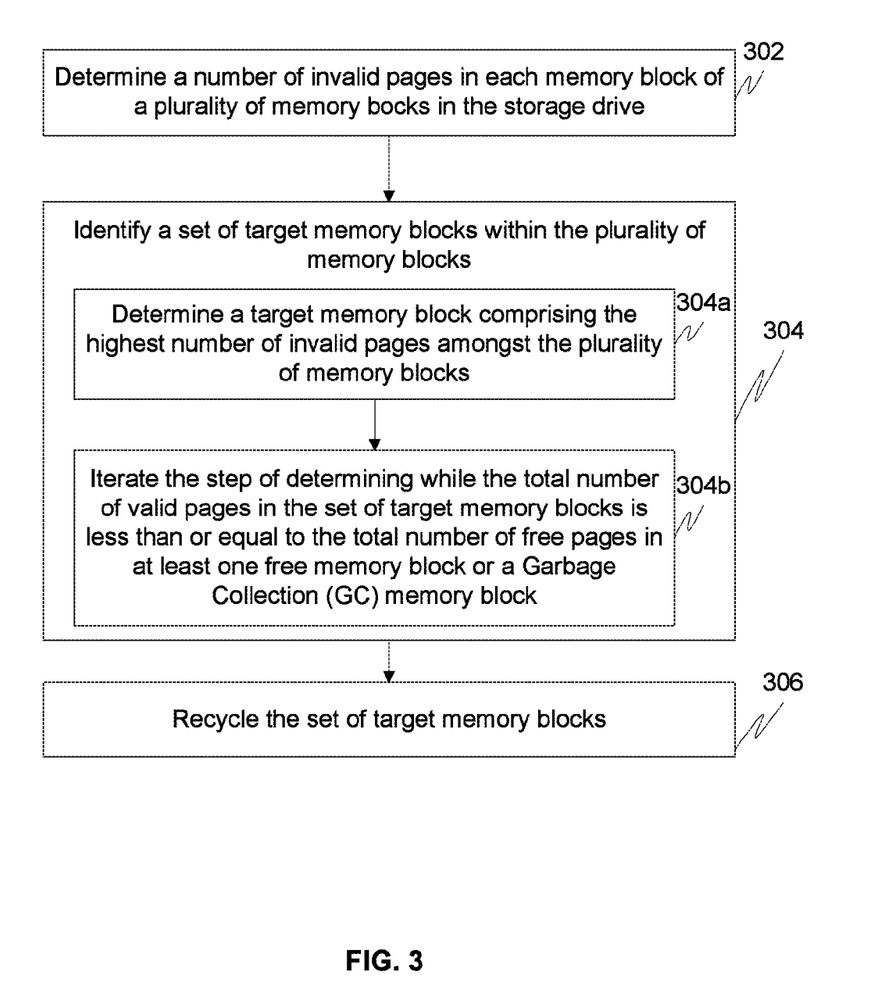
FIG. 3 illustrates a flowchart for memory management in a storage drive, in accordance with an embodiment.

Referring now to FIG. 3, a flowchart for memory management in a storage drive is illustrated, in accordance with an embodiment. The storage drive may be an SSD. The flash memory in the SSD includes a plurality of NAND based flash memory chips. Each memory chip includes a plurality of memory blocks. At 302, number of invalid pages in each memory block of the plurality of memory books is determined. Additionally, number of valid pages in each memory may also be determined. This is further explained in conjunction with FIG. 4.

Thereafter, at 304, a set of target memory blocks within the plurality of memory blocks is identified. To this end, at 304a, a target memory block that has the highest number of invalid pages amongst the plurality of memory blocks is determined. Thereafter, at 304b, the step of determining, i.e., 304a, is iterated till total number of valid pages in the set of target memory blocks is less than or equal to the total number of free pages in one or more free memory blocks or a GC memory block. In other words, after each iteration, a check is performed to see whether valid pages in the selected memory block can be accommodated within available free pages of the free memory block. Only when this condition is satisfied, the selected memory block is included in the set of target memory blocks that are to be recycled.

Thus, an iteration in which valid pages of a selected memory block cannot be accommodated in the free memory block, would be the last iteration. This memory block determined in the last iteration is not included in the set of target memory blocks to be recycled. In an embodiment, it is additionally determined whether the target memory block comprises lowest number of valid pages amongst the plurality of memory blocks. Thus, in this embodiment, a target memory block should have maximum invalid pages and minimum valid pages amongst the plurality of memory blocks. This is further explained in detail in conjunction with FIGS. 4A and 4B.

For example, the total number of memory blocks in the flash memory is 24 and it has one free memory block that has 128 pages. In the first iteration, that memory block is selected which has the highest number of invalid pages amongst the 24 memory blocks. In the second iteration, that memory block is selected, which has the highest number of invalid pages amongst the 23 memory blocks that are left. The condition for inclusion of selected memory blocks in the set of target memory blocks to be recycled is that the valid pages in the selected memory block can be accommodated within 128 pages of the free memory block.

Thereafter, at 306, the set of target memory blocks are recycled. To recycle the set of target memory blocks, valid pages of each of the set of target memory blocks is first copied to free pages available in the one or more free memory blocks or the GC memory block. Thereafter, the set of target memory blocks are converted to free memory blocks. This is further explained in conjunction with FIGS. 4A and 4B. The recycling of memory blocks is initiated independent of a write operation on the storage drive. As a result, write operations to the SSD are not delayed and user experience is not impacted.

Figure 4A:
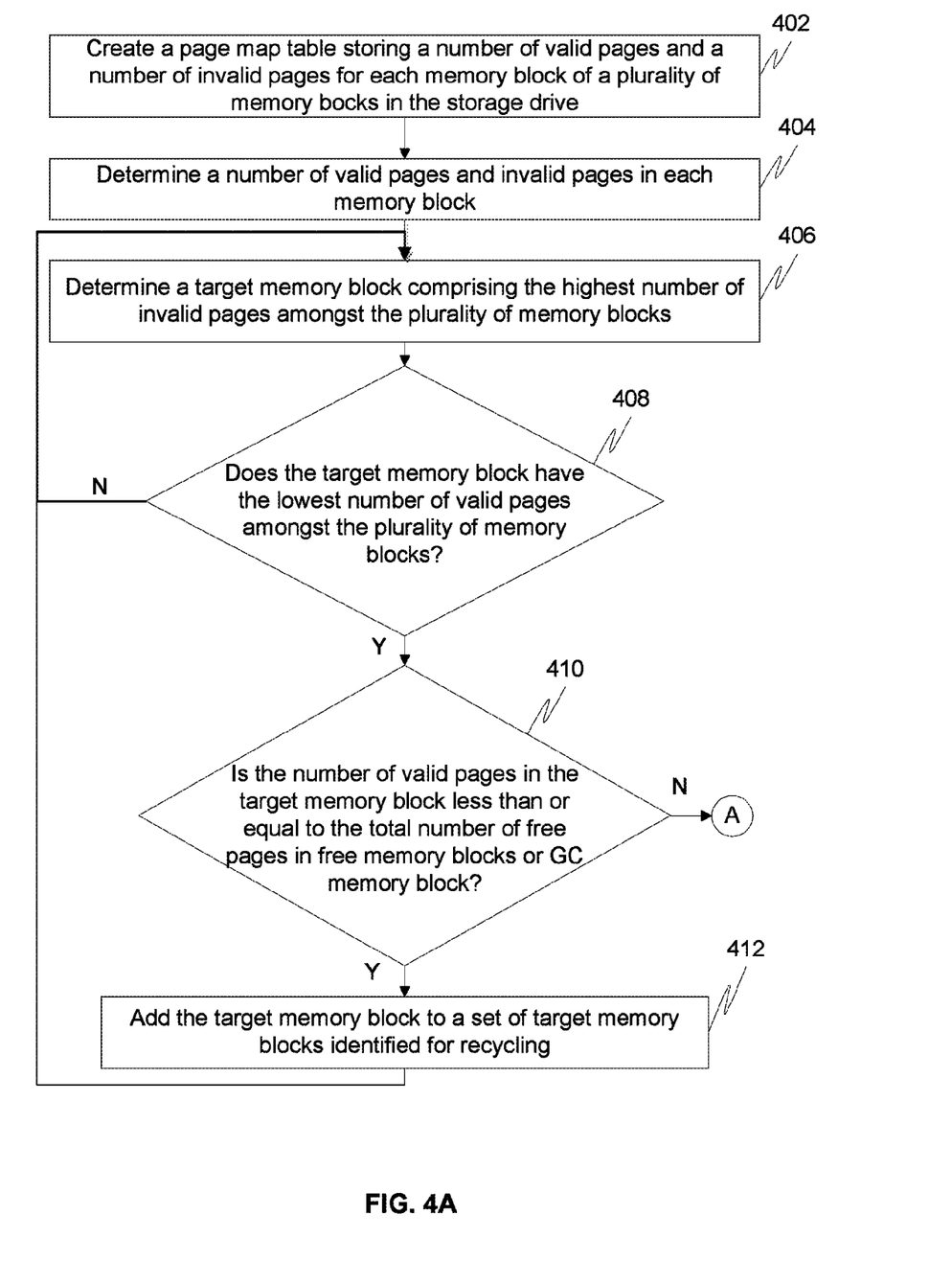
FIGS. 4A and 4B illustrates a flowchart for memory management in a storage drive, in accordance with another embodiment.
Figure 4B:
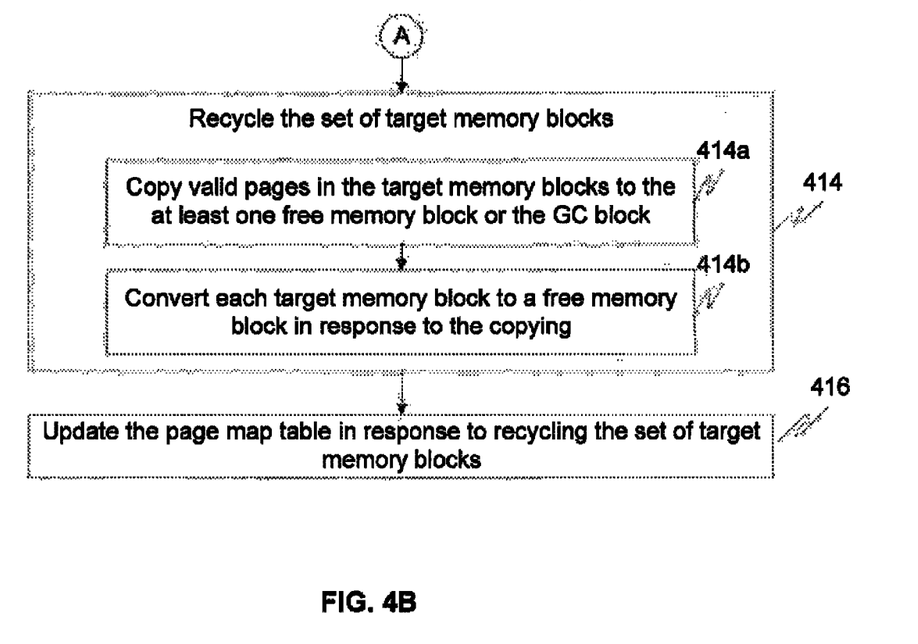

Referring now to FIGS. 4A and 4B, a flowchart for memory management in a storage drive is illustrated, in accordance with another embodiment. The storage drive is an SSD. At 402, wear levelling module 204 creates and maintains a page map table, which is representative of memory status in the SSD. The page map table stores number of valid pages and number of invalid pages for each memory block in the storage drive. The page map table may additionally store number of free pages for each memory block. The page map table is explained in detail in conjunction with an exemplary embodiment given in FIGS. 5A and 5B. At 404, the page map table is used to determine number of valid pages and invalid pages in each memory block of the SSD at a given point of time.

Based on the information retrieved from the page map table, a target memory block is determined at 406. The number of invalid pages in the target memory block is the highest amongst the plurality of memory blocks. Thereafter, at 408, a check is performed to determine whether the target memory block has the lowest number of valid pages amongst the plurality of memory blocks. In other words, such target memory block is determined which not only has the highest number of invalid pages but also has the lowest number of valid pages amongst the plurality of memory blocks.

If the target memory block does not have the lowest number of valid pages, the control is returned back to 406. However, referring back to 408, if the target memory block has the lowest number of valid pages, a check is performed at 410 to determine whether the number of valid pages in the target memory block is less than or equal to total number of free pages in one or more free memory blocks or a GC memory block. In other words, it is checked whether the valid pages in the target memory block can be copied into the available free pages of a free memory block or a GC block. If the number of valid pages of the target memory block satisfies this criterion, the target memory block is added to a set of target memory blocks identified for recycling at 412. Thereafter, the control goes back to 406 where another target memory block is determined. For example, amongst 24 memory blocks, a target memory block that has 80 invalid pages (highest amongst 24 memory blocks) and 20 valid pages (lowest amongst 24 memory blocks) is identified in the first iteration. Also, only one free memory block with 128 free pages is available in the SSD. In this case, as 20 valid pages can easily be accommodated amongst 128 free pages, thus target memory block is added to a set of target memory blocks that are to be recycled. Thereafter, in the second iteration, amongst 23 memory blocks left, a target memory block that has 70 invalid pages (highest amongst 23 memory blocks) and 30 valid pages (lowest amongst 23 memory blocks) is identified. After accommodating 20 valid pages, the free memory block is left with 108 free pages, as a result, 30 pages of target memory block identified in the second iteration can also be copied in the free memory block. As a result, this target memory block is also included in the set of target memory blocks. This process is repeated till no more valid pages of an identified target memory block can be copied to a free memory block. This is further explained in conjunction with the exemplary embodiment of FIGS. 5A and 5B.

Referring back to step 410, if the number of valid pages in the target memory block is more than total number of free pages in one or more free memory blocks or a GC memory block, the set of target memory blocks is recycled at 414. In other words, if valid pages of a target memory block cannot be accommodated in available free pages of the free memory block the target memory block is not added in the set of target memory blocks that are to be recycled. In continuation of the example given above, in an $n^{th}$ iteration, a target memory block that has 60 invalid pages and 40 valid pages is identified. However, the free memory block is only left with 28 free pages, as a result, all of the 40 valid pages of the target memory block identified in the $n^{th}$ iteration cannot be copied into the free memory block. Thus, this target memory block is not added to the set of target memory blocks that are to be recycled.

To recycle the set of target memory blocks, at 414a, valid pages in each target memory block of the set are copied to the one or more free memory blocks or the GC memory block. Thereafter, at 414b, each target memory block of the set is converted into a free memory block. To reflect the changes made to the set of target memory blocks and the free memory block or the GC block, the page map table is updated at 416.

As a memory block to be recycled is selected based on maximum invalid pages and minimum valid pages using the page map table, more invalid pages are freed and less valid pages are required to be copied to a free memory block. This improves the Input/Output performance of the SSD and frees up more space at a given time. Moreover, as more than one memory blocks are freed in a single garbage collection operation, system resource usage is optimized. Therefore, there is no delay in writing operation on the SSD and the user experience does not get impacted.

Figure 5A:
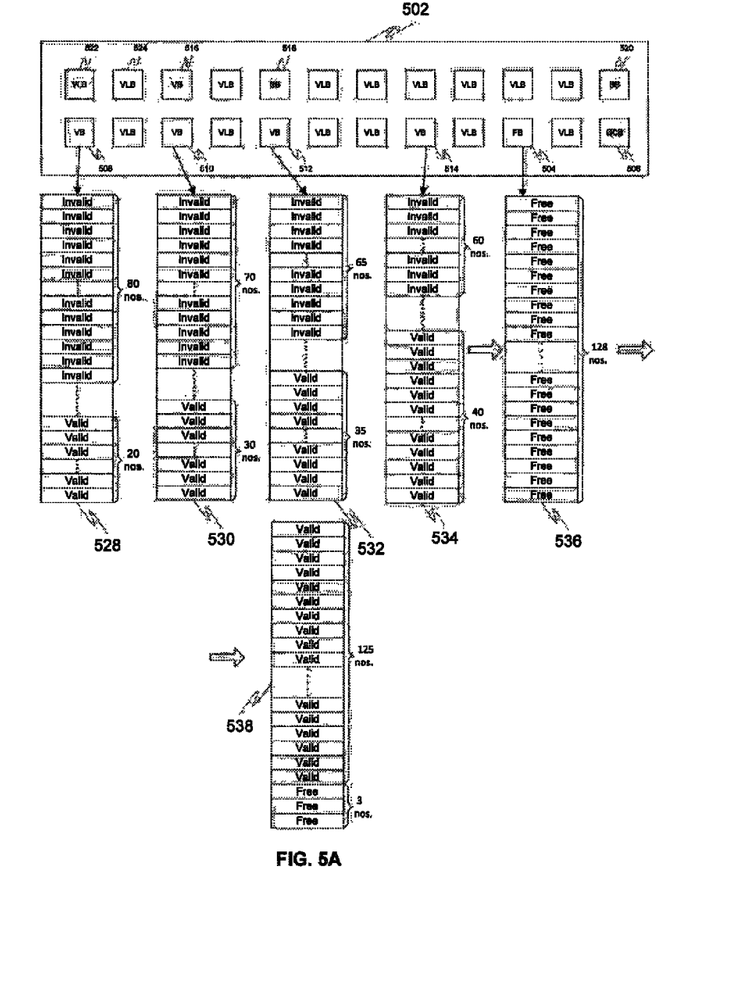
FIGS. 5A and 5B illustrates recycling of a set of target memory blocks to convert them to free memory blocks, in accordance with an exemplary embodiment.
Figure 5B:
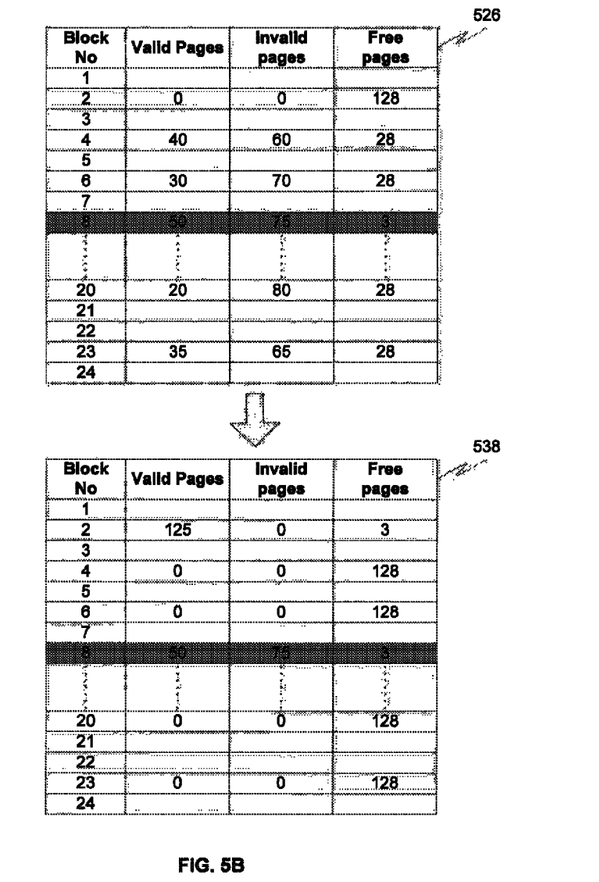

Referring now to FIGS. 5A and 5B, recycling of the set of target memory blocks to convert them to free memory blocks is illustrated, in accordance with an exemplary embodiment. Drive controller 200 performs memory management operations on a NAND memory chip 502 that includes 24 memory blocks within an SSD (not shown in FIGS. 5A and 5B). A memory block may be a Valid Block (VLB), a Free Block (FB), a Garbage Collector Block (GCB), a Victim Block (VB), and a Bad Block (BB). A FB is a memory block which only includes free pages (for example, a memory block 504), a GCB is a free memory block that is reserved for use by the garbage collector (for example, a memory block 506), a VB is a memory block that has been shortlisted for being erased or deleted and includes more invalid pages than valid pages (for example, memory blocks 508-516), a BB is a memory block that is corrupted and is not used for data storage (for example, memory blocks 518 and 520), and a VLB is a memory block that includes only valid pages (for example, memory block 522 and 524).

To perform memory management operation, during each iteration, garbage collector module 208 accesses a page map table 526 to identify a target memory block that has the highest invalid pages and the lowest valid pages amongst the 24 memory blocks in NAND memory chip 502. Page map table 526 includes details regarding number of invalid pages, number of valid pages, and number of free pages in each of the 24 memory blocks of NAND memory chip 502. It will be apparent to a person skilled in the art that for ease of discussion, number of invalid, valid, and free pages has been mentioned only for the VBs (i.e., memory blocks 508-516) and FB (i.e., memory block 504).

Based on the information in page map table 526, in the first iteration, garbage collector module 208 identifies block no: 20 in page map table 526. Block no: 20, which is memory block 508, is identified as it has the highest number of invalid pages, i.e., 80 and the lowest number of valid pages, i.e., 20, amongst the 24 memory blocks. This is also depicted by a page layout block 528. As 20 valid blocks can be accommodated within 128 free pages of memory block 504 (Block no: 2 in page map table 526), memory block 508 is added to a set of target memory blocks that are to be recycled. After copying these 20 valid pages, free memory block 504 would be left with 108 free pages.

Thereafter, in the second iteration, garbage collector module 208 identifies block no: 6 in page map table 526. Block no: 6, which is memory block 510, is identified as memory block 510 has the highest number of invalid pages, i.e. 70 and the lowest number of valid pages, i.e., 30, amongst the 23 memory blocks (excluding memory block 508). This is also depicted by a page layout block 530. As 30 valid blocks can be accommodated within 108 free pages of memory block 504, memory block 510 is added to the set of target memory blocks. After copying these 30 valid pages, memory block 504 is left with 78 free pages. It must be noted here that though block no: 8 of page map table 526, which is memory block 516, had the highest number of invalid pages (75) in the second iteration, memory block 516 is not selected as it does not have the lowest number of valid pages amongst the 23 memory blocks. Thus, garbage collector module 208 moves on to memory block 510 that has the second highest number of invalid pages, but the lowest number of valid pages.

Similarly, in the third iteration, garbage collector module 208 identifies block no: 23 amongst 22 memory blocks (excluding memory block 508 and 510). Block no: 23 is memory block 512, which includes 65 invalid pages and 35 valid pages. This is also depicted by a page layout block 532. After 35 valid pages of memory block 512 have been accommodated, memory block 504 is left with 43 free pages.

Thereafter, in fourth iteration, garbage collector module 208 identifies block no: 4, amongst 21 memory blocks (excluding memory blocks 508, 510, and 512). Block no: 4 of page map table 526 is memory block 514 that includes 60 invalid pages and 40 valid pages. This is also depicted by a page layout block 534. After copying 40 valid pages of memory block 514 into memory block 504, only 3 free pages are left in memory block 504. A page layout block 536 depicts memory block 504 before copying any valid page and a page layout block 538 depicts memory block 504 after all valid pages in the set of target memory blocks are copied to memory block 504. For ease of description, page layout blocks 528 to 538 depict invalid pages and valid pages as contiguous pages; however, it will be apparent to a person skilled in the art that the invention is not limited to such depiction.

In the last iteration, garbage collector module 208 identifies block no: 8 amongst 20 memory blocks (excluding memory blocks 508, 510, 512 and 514). Block no: 8 is memory block 516, which includes the highest number of invalid blocks (75) and minimum number of valid blocks (50) in this iteration. However, as memory block 504 is only left with 3 free pages, thus, all valid pages of memory block 516 cannot be copied to memory block 504. As a result, memory block 516 is not included in the set of target memory blocks for being recycled.

Thus, after the last iteration, the set of target memory blocks identified for being recycled includes memory blocks 508, 510, 512, and 514. After valid pages of these memory blocks have been copied into memory block 504, each of these memory blocks is converted to a free memory block. Thereafter, wear levelling module 204 updates page map tale 526 to reflect these changes made in memory blocks 508, 510, 512, 514, and 504. The new data regarding valid pages, invalid pages, and free pages for each of the 24 memory blocks in NAND memory chip 502 is thus represented by a page map table 538.

Figure 6:
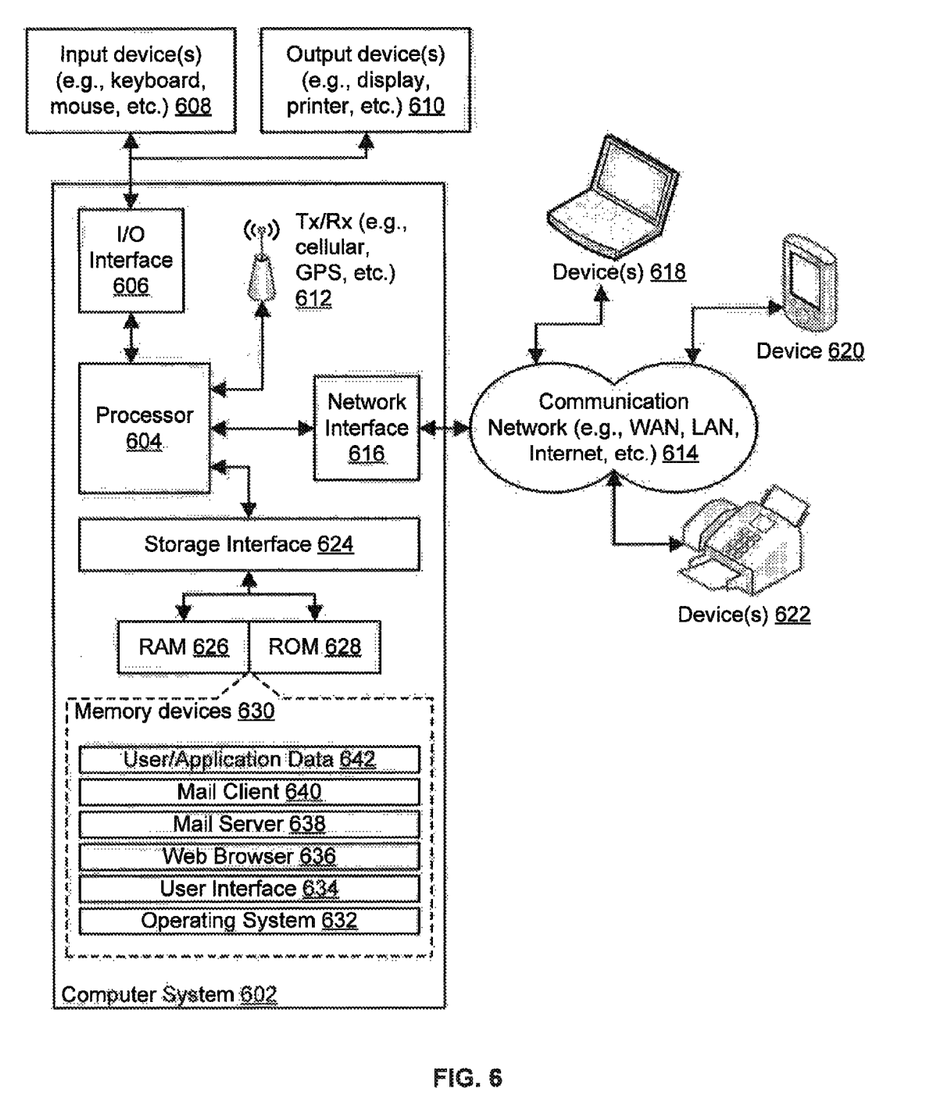
FIG. 6 illustrates a block diagram of an exemplary computer system for implementing various embodiments

Referring now to FIG. 6, a block diagram of an exemplary computer system for implementing various embodiments is disclosed. Computer system 602 may comprise a central processing unit ("CPU" or "processor") 604. Processor 604 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. Processor 604 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 604 may be disposed in communication with one or more input/output (I/O) devices via an I/O interface 606. I/O interface 606 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM) long-term evolution (LTE), WiMax, or the like), etc.

Using I/O interface 606, computer system 602 may communicate with one or more I/O devices. For example, an input device 608 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like) stylus, scanner, storage device, transceiver, video device/source, visors, etc. An output device 610 may be a printer, fax machine, video display (e.g., cathode ray tube (CRT), liquid crystal display (LCD), light-emitting diode (LED), plasma or the like), audio speaker, etc. In some embodiments, a transceiver 612 may be disposed in connection with processor 604. Transceiver 612 may facilitate various types of wireless transmission or reception. For example, transceiver 612 may include an antenna operatively connected to a transceiver chip (e.g., Texas Instruments WiLink WL1283, Broadcom BCM4750IUB8 Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 604 may be disposed in communication with a communication network 614 via a network interface 616. Network interface 616 may communicate with communication network 614. Network interface 616 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. Communication network 614 may include, without limitation, a direct interconnection, local area network (LAN), wide area network (WAN), wireless network (e.g., using Wireless Application Protocol), the Internet, etc. Using network interface 616 and communication network 614, computer system 602 may communicate with devices 618, 620 and 622. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 602 may itself embody one or more of these devices.

In some embodiments, processor 604 may be disposed in communication with one or more memory devices (e.g., RAM 626, ROM 628, etc.) via a storage interface 624. Storage interface 624 may connect to memory devices 630 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory devices 630 may store a collection of program or database components, including, without limitation, an operating system 632, a user interface application 634, a web browser 636, a mail server 638, a mail client 640, a user/application data 642 (e.g., any data variables or data records discussed in this disclosure), etc. Operating system 632 may facilitate resource management and operation of the computer system 602. Examples of operating system 632 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 634 may facilitate display, execution, interaction, manipulation, or operation of program components through textual or graphical facilities. For example, user interfaces may provide computer interaction interface elements on a display system operatively connected to computer system 602, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 602 may implement web browser 636 stored program component. Web browser 636 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 602 may implement mail server 638 stored program component. Mail server 638 may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, computer system 602 may implement mail client 640 stored program component. Mail client 640 may be a mail viewing application, such as Apple Mail, Microsoft Entourage, Microsoft Outlook, Mozilla Thunderbird, etc.

In some embodiments, computer system 602 may store user/application data 642, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination. It will be appreciated that for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Alternate Embodiment

In an alternate embodiment, based on the information retrieved from the page map table, a set of target memory blocks is identified such that, number of invalid pages in each memory block is more than equal to a maximum invalid page threshold. In other words, those memory blocks in which the number of invalid pages is above a given threshold are selected. For example, the total number of memory blocks in the flash memory is 24 and the maximum invalid page threshold may be fixed at 40. Moreover, 12 of these 24 memory blocks have more than 40 invalid pages and are thus identified as the set of target memory blocks. In a scenario where the garbage collection operation is initiated when only one free memory block is left in the flash memory, the maximum invalid page threshold would be zero. Thereafter, a subset is selected from the set of target memory blocks. The subset is selected such that number of valid pages in each memory block of the subset is less than equal to a minimum valid page threshold. For example, the total number of memory blocks in the flash memory is 24 and the minimum valid page threshold may be fixed at 40. Further, amongst the 12 memory blocks identified as the set of memory blocks at 406, only six memory blocks have less than or equal to 40 valid pages. Thus, these six memory blocks are selected as the subset. The subset so selected may be further pruned down by adding another criterion of a threshold number of free pages in a memory block. Thus in this case, shortlisting of memory blocks for recycling may depend on satisfaction of three criteria, namely, a threshold number of invalid pages, a threshold number of valid pages, and a threshold number of free pages in a memory block.

Thereafter, the set of target memory blocks are recycled. The total number of valid pages in the set of target memory blocks is less than or equal to the total number of pages in one or more free memory blocks in the storage drive. In other words, selection of the set of target memory blocks is dependent on availability of free memory blocks. The reason for such selection is that in order to recycle a memory block, the valid pages in that memory block need to be first copied to a free memory block and only then the memory block can be recycled and converted to a free memory block. Therefore, when there are more than one memory block that need to be recycled, only those memory blocks would be selected for which the total number of valid pages can be copied into the available free memory blocks.

In continuation of the example given above, 12 memory blocks were identified as the set of memory blocks as the number of invalid pages in each of these 12 memory blocks was above the maximum invalid page threshold of 60. Additionally, only one free memory block in the storage drive is available that has 128 pages. Moreover, for a memory block to be recycled, its valid pages need to be first copied to a free memory block. Thus, in this example, only five memory blocks are recycled, because the total number of valid pages in these memory blocks is less than and almost equal to 128. Another memory block in addition to these five memory blocks could not be selected, as the free memory block would not have enough space to accommodate valid pages of another memory block. In an embodiment, the memory blocks to be recycled may be selected based on the descending order of the number of invalid pages. In other words, the memory block that has the maximum number of invalid pages is the first one to be recycled followed by the memory block in which the number of invalid pages are second in order.

Various embodiments of the invention provide methods and system for memory management in a storage drive. The garbage collector module selects a memory block to be recycled based on maximum invalid pages and minimum valid pages using the page map table. As a result, more invalid pages are freed and less valid pages are required to be copied to a free memory block. This improves the Input/Output performance of the SSD and frees up more space at a given time. Moreover, as more than one memory blocks are freed in a single garbage collection operation, system resource usage is optimized. Therefore, there is no delay in writing operation on the SSD and the user experience does not get impacted.

The specification has described methods and systems for memory management in storage drives. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of managing memory of a storage drive, the memory comprising a plurality of memory blocks, at least one free memory block, and a Garbage Collection (GC) memory block, the method comprising:
   determining a number of invalid pages in each memory block of the plurality of memory blocks in the storage drive;
   identifying a set of target memory blocks within the plurality of memory blocks by iterating:

determining a memory block comprising a highest number of invalid pages amongst the plurality of memory blocks excluding the identified set of target memory blocks to identify a target memory block for inclusion into the set of target memory blocks, while a total number of valid pages in the set of target memory blocks and the identified target memory block remains less than or equal to the total number of free pages in at least one of the at least one free memory block and the GC memory block; and recycling the set of target memory blocks.

2. The method of claim 1, further comprising determining a number of valid pages in each memory block of the plurality of memory blocks.

3. The method of claim 2, further comprising creating a page map table storing the number of valid pages and the number of invalid pages for each memory block of the plurality of memory blocks.

4. The method of claim 3 further comprising updating the page map table in response to recycling the set of target memory blocks.

5. The method of claim 1, wherein identifying the set of target memory blocks comprises determining, at each iteration, whether the identified target memory block comprises a lowest number of valid pages amongst the plurality of memory blocks excluding the set of target memory blocks.

6. The method of claim 1, wherein recycling of the set of target memory blocks is initiated independent of a write operation on the storage drive.

7. The method of claim 1, wherein recycling comprises copying each valid page in the set of target memory blocks to one of the at least one free memory block and the GC memory block.

8. The method of claim 7, wherein recycling comprises converting each of the set of target memory blocks to a free memory block in response to the copying.

9. A method of managing memory of a storage drive, the memory comprising a plurality of memory blocks, at least one free memory block, and a Garbage Collection (GC) block, the method comprising:

determining a number of invalid pages in each memory block of a plurality of memory blocks in the storage drive;

identifying a set of memory blocks from the plurality of memory blocks through an iterative selection process, wherein the iterative selection process comprises selecting each memory block in the set of memory blocks comprising a highest number of invalid pages amongst the plurality of memory blocks during an associated iteration, wherein each subsequent iteration in the iterative selection process for selecting a memory block excludes a memory block selected in a previous iteration, and wherein a total number of valid pages in the set of memory blocks is less than or equal to the total number of free pages in at least one of the at least one free memory block and the GC memory block in the storage drive; and recycling the set of memory blocks.

10. A storage drive comprising:

a memory comprising a plurality of memory blocks, at least one free memory block, and a Garbage Collection (GC) memory block;

a drive controller comprising at least one processor; and a computer-readable medium storing instructions that, when executed by the at least one processor, cause the at least one processor to perform operations comprising:

determining a number of invalid pages in each memory block of the plurality of memory blocks in the storage drive;

identifying a set of target memory blocks within the plurality of memory blocks by iterating:

determining a memory block comprising a highest number of invalid pages amongst the plurality of memory blocks excluding the identified set of target memory blocks to identify a target memory block for inclusion into the set of target memory blocks, while a total number of valid pages in the set of target memory blocks and the identified target memory block remains less than or equal to the total number of free pages in at least one of the at least one free memory block and the GC memory block in the storage drive; and recycling the set of target memory blocks.

11. The storage drive of claim 10, wherein the operations further comprise determining a number of valid pages in each memory block in the plurality of memory blocks.

12. The storage drive of claim 11, wherein the operations further comprise creating a page map table storing the number of valid pages and the number of invalid pages for each memory block in the plurality of memory blocks.

13. The storage drive of claim 12, wherein the operations further comprise updating the page map table in response to recycling the at least one memory block.

14. The storage drive of claim 10, wherein the operation of identifying further comprises operation of determining, at each iteration, whether the identified target memory block comprises a lowest number of valid pages amongst the plurality of memory blocks excluding the set of target memory blocks.

15. The storage drive of claim 10, wherein the operation of recycling further comprises operation of copying each valid page in the set of target memory blocks to one of the at least one free memory block and the GC memory block.

16. The storage drive of claim 15, wherein the operation of recycling comprises operation of converting each of the set of target memory blocks to a free memory block in response to the copying.

17. A non-transitory computer-readable storage device for managing memory of a storage drive, the memory comprising a plurality of memory blocks, at least one free memory block, and a Garbage Collection (GC) memory block, the computer-readable storage device storing instructions that, when executed by a computing device, cause the computing device to:

determine a number of invalid pages in each memory block of a plurality of memory blocks in the storage drive;

identify a set of target memory blocks within the plurality of memory blocks by iterating:

determining a memory block comprising a highest number of invalid pages amongst the plurality of memory blocks excluding the identified set of target memory blocks to identify a target memory block for inclusion into the set of target memory blocks, while a total number of valid pages in the set of target memory blocks and the identified target memory block remains less than or equal to the total number of free pages in at least one of the at least one free memory block and the GC memory block in the storage drive; and recycling the set of target memory blocks.

18. The non-transitory computer-readable storage device of claim 17, further comprising determining a number of valid pages in each memory block in the plurality of memory blocks.

19. The non-transitory computer-readable storage device of claim 17, wherein identifying the set of target memory blocks comprises determining, at each iteration, whether the identified target memory block comprises a lowest number of valid pages amongst the plurality of memory blocks excluding the set of target memory blocks.

20. The non-transitory computer-readable storage device of claim 17, wherein recycling comprises:

copying each valid page in the set of target memory blocks to one of the at least one free memory block and the GC memory block; and converting each of the set of target memory blocks to a free memory block in response to the copying.

* * * * *